Sept. 1, 1970 G. C. BARNETTE 3,526,455
TACHISTOSCOPIC APPARATUS
Filed July 17, 1967 6 Sheets-Sheet 1
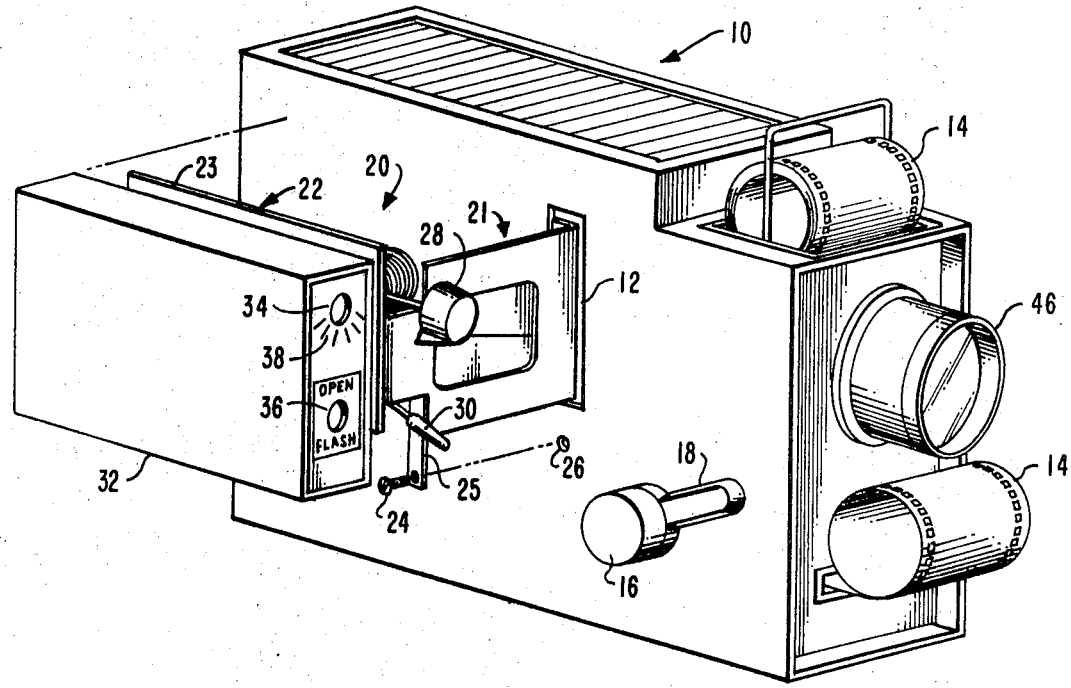
FIG.—1
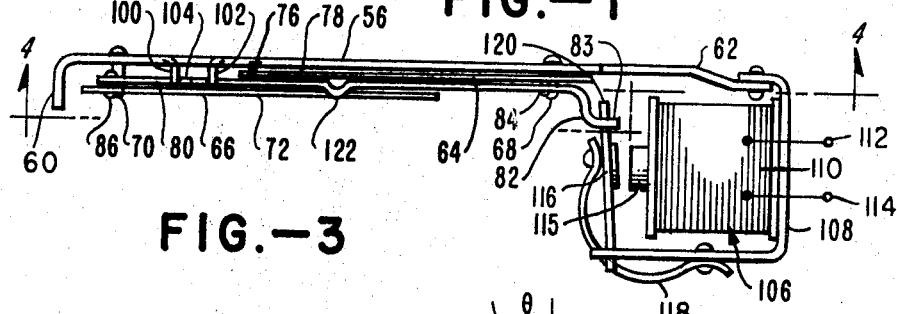
FIG.—3
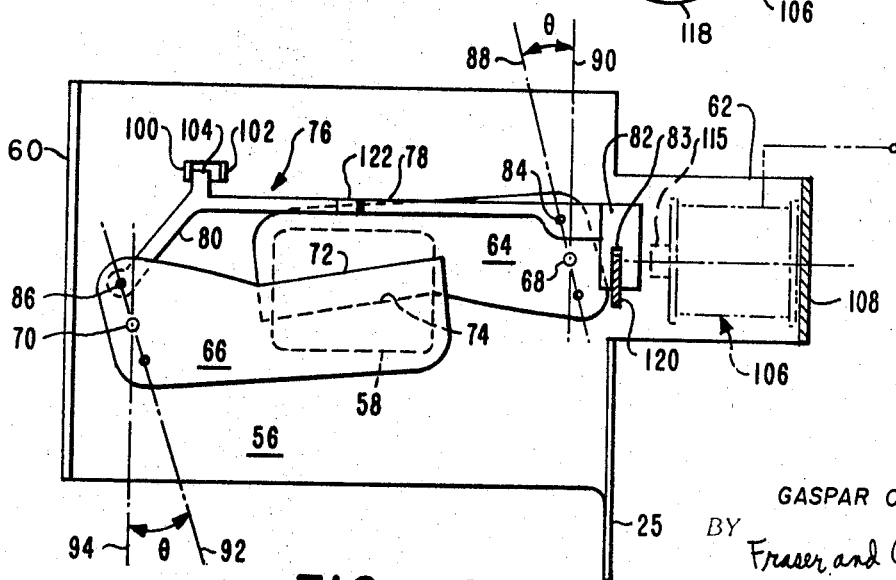
FIG.—4
INVENTOR.
GASPAR C. BARNETTE
BY Fraser and Bogucki
ATTORNEYS

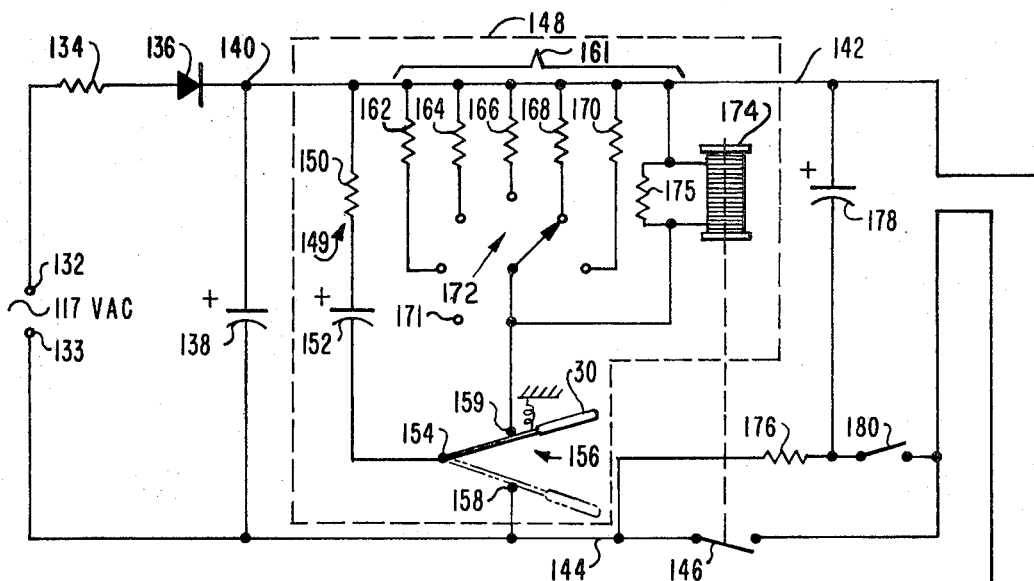
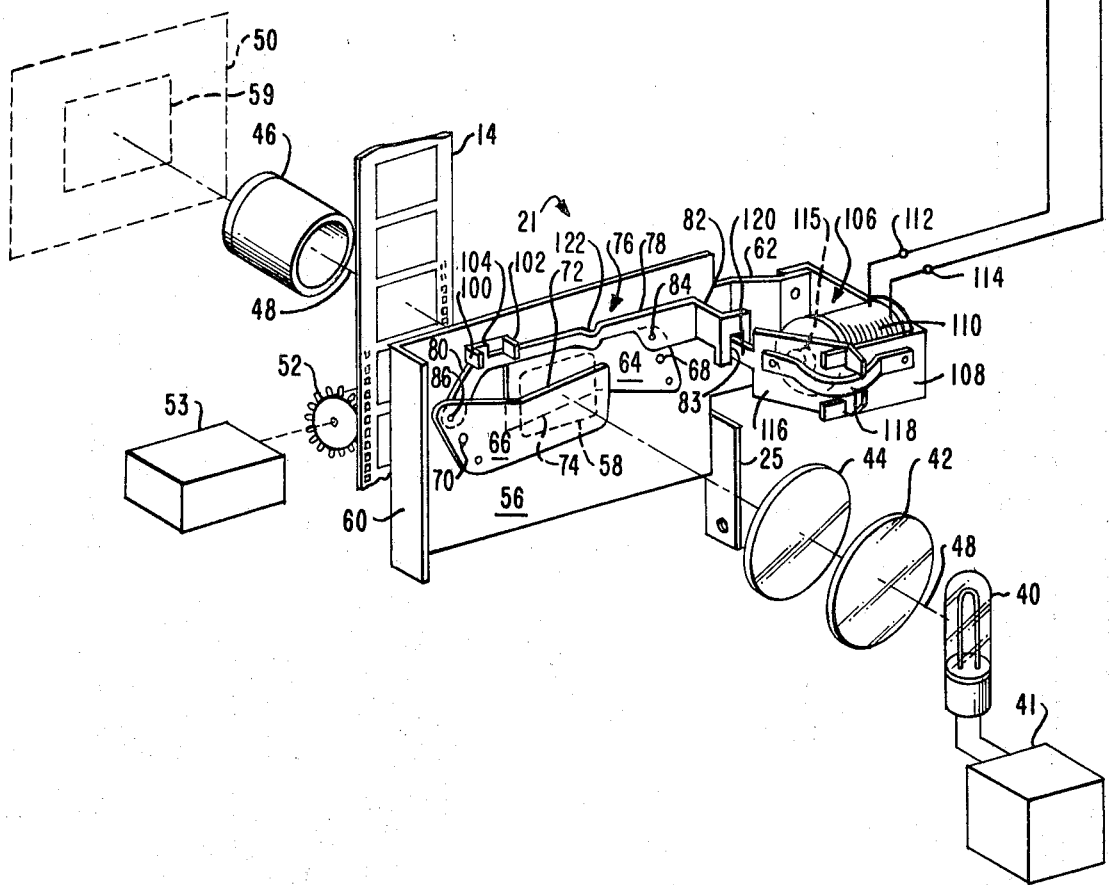
FIG.—2

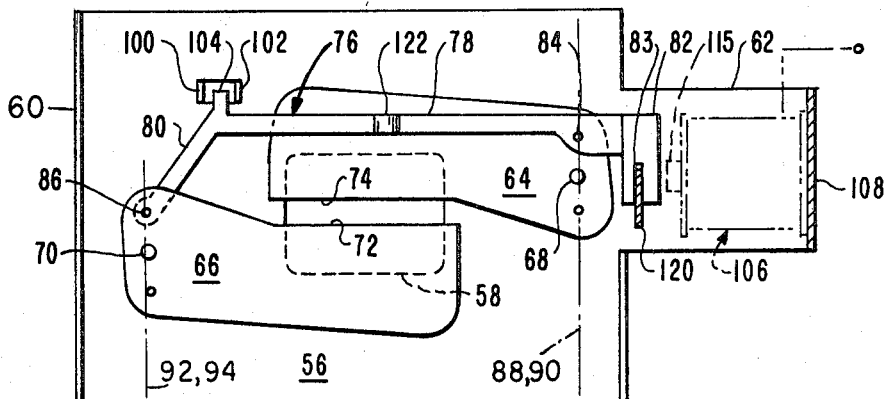
FIG.—5
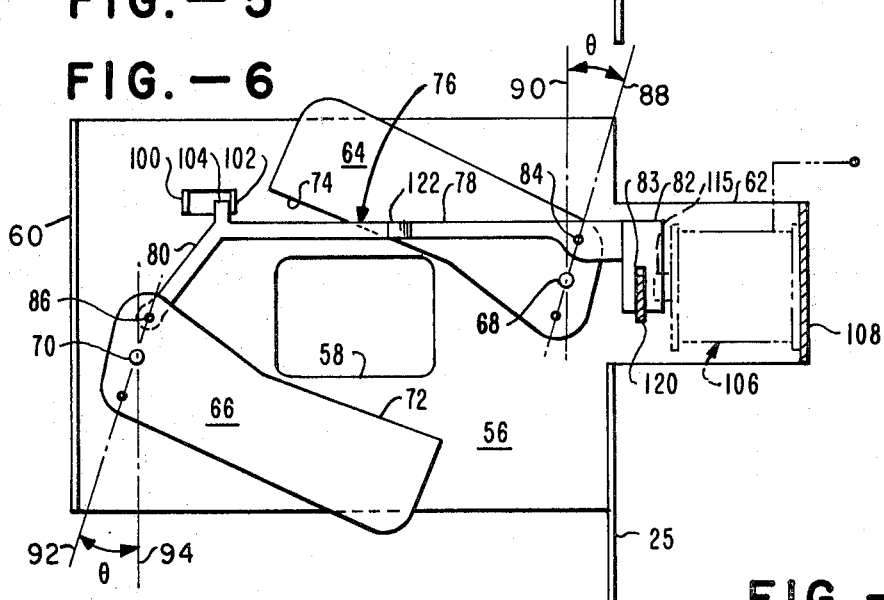
FIG.—6
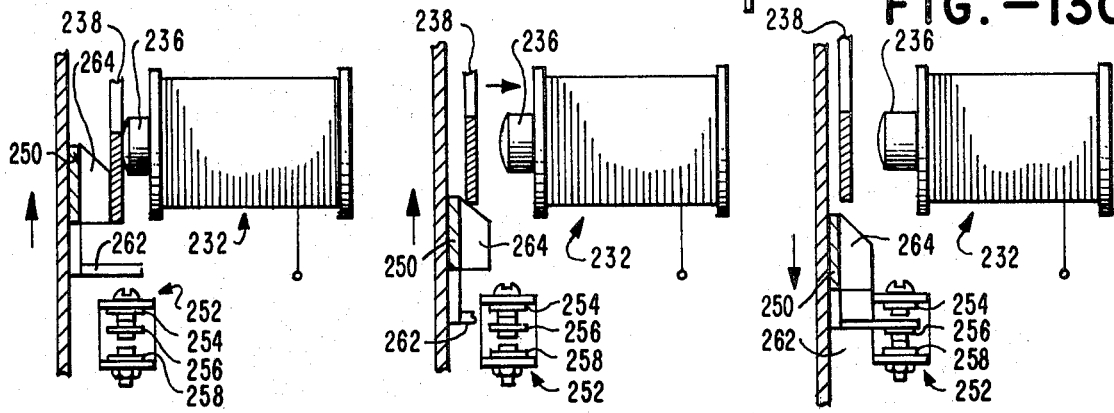
FIG.—13A  FIG.—13B  FIG.—13C
INVENTOR.
GASPAR C. BARNETTE
BY Fraser and Bogucki
ATTORNEYS Sept. 1, 1970  G. C. BARNETTE  3,526,455

TACHISTOSCOPIC APPARATUS

Filed July 17, 1967  6 Sheets-Sheet 4

*INVENTOR.*
GASPAR C. BARNETTE

BY Fraser and Bogucki

ATTORNEYS

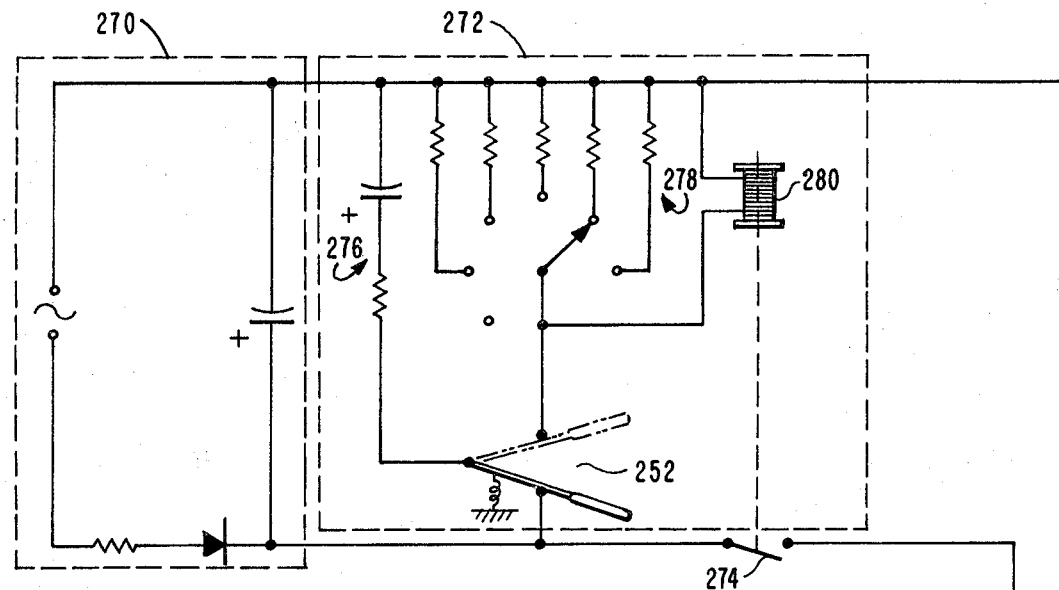
FIG. — 9
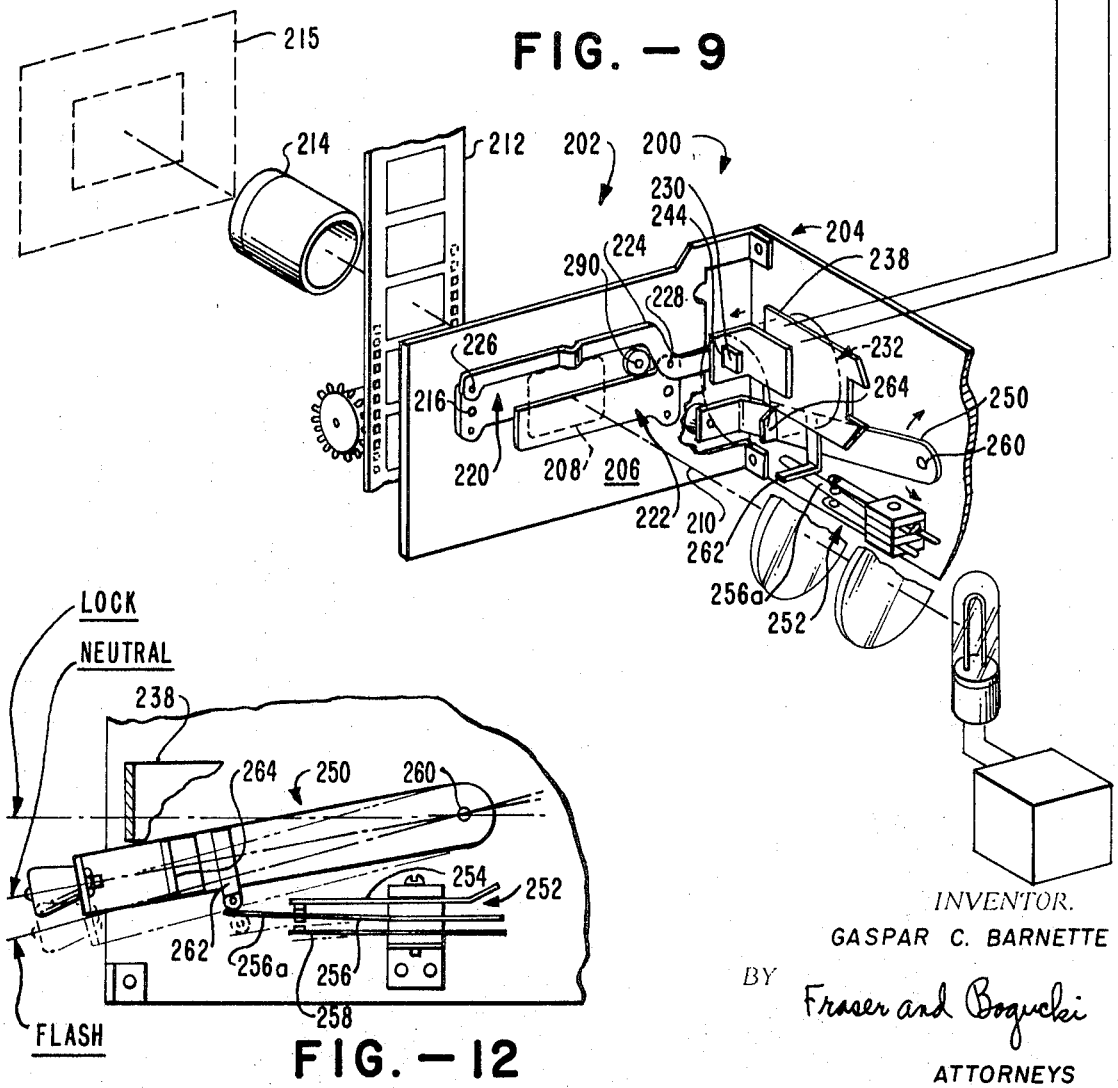
FIG. — 12

Sept. 1, 1970 G. C. BARNETTE 3,526,455
TACHISTOSCOPIC APPARATUS
Filed July 17, 1967 6 Sheets-Sheet 6
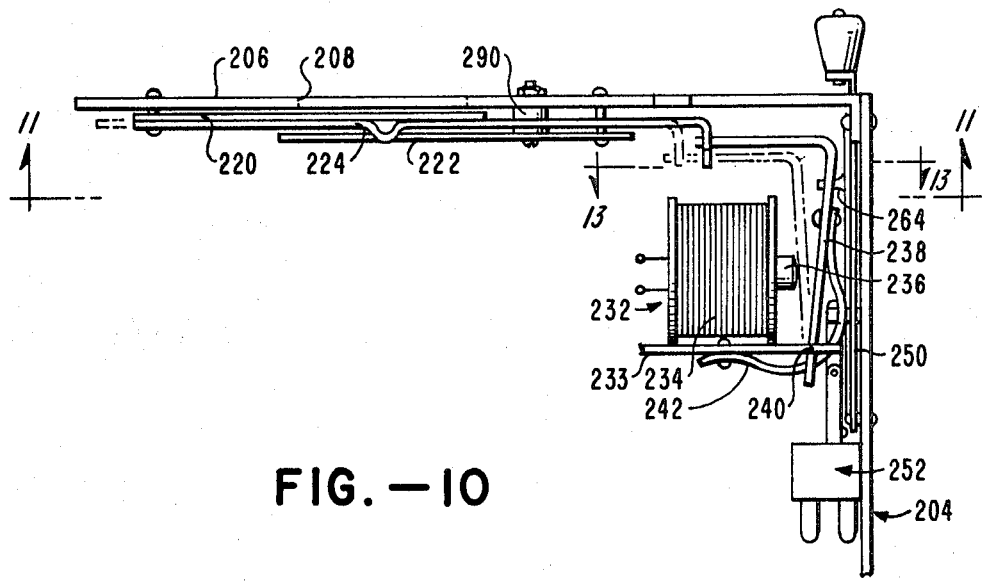
FIG.—10
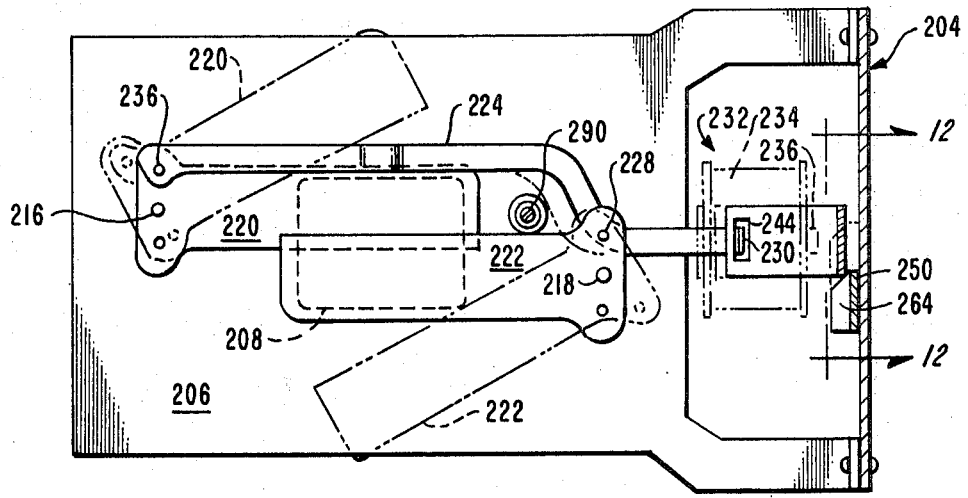
FIG.—11
INVENTOR.
GASPAR C. BARNETTE
BY Fraser and Bogucki
ATTORNEYS 3,526,455
TACHISTOSCOPIC APPARATUS
Gaspar Cisneros Barnette, 7138 Samoa Place,
Tujunga, Calif. 91042
Filed July 17, 1967, Ser. No. 653,706
Int. Cl. G03b 21/14, 19/04, 9/10
U.S. Cl. 353—91                                         12 Claims

ABSTRACT OF THE DISCLOSURE

A shutter mechanism, having a scissors action and operable to open for a brief interval in response to a control signal, is positioned in the optical path extending between the light source and the viewing screen of a tachistoscopic system. The shutter mechanism has two shutter blades, pivoted about points on opposite sides of an aperture to open from the center outwardly. A link, movable by an electromagnet, and connected to the shutter blades, is used to provide opposite directions of rotation of the blades. The inner edges of the blades may be angled so that as the blades move apart, a rectangular, horizontal slit is formed which makes a central, rectangular portion of the image immediately visible on the viewing screen. Suitable control circuitry is provided and connected to the electromagnet to move the link and thereby move the shutters from the closed position to the open position for a predetermined duration. In addition, a lock is provided for holding the shutter in the open position for continuous viewing.

BACKGROUND OF THE INVENTION

This invention relates generally to apparatus for providing tachistoscopic displays, and more particularly to shutter systems for use in tachistoscopic projectors.

The increased use of audio-visual techniques in education has included widespread use of projection systems based upon the tachistoscopic principle. This principle utilizes a momentary, closely controlled display of an image upon a viewing element. The image may comprise forms, numbers, code groups, words, phrases, or sentences shown either as a single display or as part of a controlled, predetermined sequence of gradually increasing difficulty. The tachistoscopic technique has been demonstrated to improve reading and arithmetic skills, for example, by developing reception, concentration, retention and comprehension. The student is taken through a sequence of tachistoscopic presentations forming an individual lesson, or through a number of sequences, to provide a logical progression of educational material.

When using a tachistoscopic projector, the operating sequence, following loading of the film strip, requires advancing of the film and either continuous exposure of the frame (for example, where instructions are being given) or flash illumination of the frame for the desired time duration. The brief illumination of the frame has heretofore been accomplished in a generally satisfactory manner by mounting a light interrupter or flasher device in front of the projector lens. A shutter mechanism in the flasher device is manually operated so as to illuminate the viewing element typically in the form of a projection screen, for a selected time interval. While tachistoscopic projections using a light blocking shutter mechanism in this fashion have proved economical and reliable, they do require a certain amount of manual dexterity and control. The duration of the flash is controlled by the speed with which the shutter mechanism is moved and this is obviously highly variable though some operators can acquire a considerable degree of skill.

Tachistoscopic shutter mechanisms of the type under consideration should preferably be simple and inexpensive. The movable members should have the least possible inertia so that there is minimal delay in the response of the mechanism to an energizing pulse. One shutter system which has been successfully used in tachistoscopic viewers is disclosed in copending application Ser. No. 494,051, filed Oct. 8, 1965 entitled "Display Control for Testing and Teaching Device," now U.S. Pat. No. 3,341,-951 issued Sept. 19, 1967.

It is also desirable that the shutter system be usable with existing, commercially available slide and film strip projectors. The addition of the shutter apparatus to a standard projector is preferably accomplished without modification of the existing projector so as not to impair its normal functioning.

Another feature which is desirable in tachistoscopic shutter systems is repeatability of the flash interval or duration. The shutter "open" duration is therefore best controlled automatically, independently of any manual manipulation which may introduce errors from one flash to the next.

One of the major criteria for equipment purchased for educational purposes is cost. Schools are often marginally budgeted for various types of equipment, including audio-visual, which aid in the teaching process. Thus, it is of paramount importance that the costs of such equipment be minimized.

SUMMARY OF THE INVENTION

Broadly, the objects and purposes of the present invention are accomplished by provision of a shutter system which may be used with commercially available projector capable of handling both film strips and slides. The shutter apparatus of the present invention comprises a narrow structure which is conveniently inserted into the receptacle normally provided for the slide mechanism. No alteration or modification of the existing machine is necessary save the addition of a simple, single point attachment means. In this way, the normal slide projection function of the machine is in no way affected. All movable parts are of lightweight construction to minimize inertia.

Generally, the shutter system includes a support means, defining an aperture, mounted in the optical path of the projector between a light source and the projection or focusing lens. The support means carries the shutter mechanism which, in the closed position, covers the aperture. Upon a command signal, the shutter mechanism is operable with a scissors action, to open from the center of the aperture outwardly for a determinable, variable selective duration. A locking means is also provided for holding the shutter means open for any desired length of time for continuous viewing.

In accordance with one specific example of the invention, the support means is in the form of a plate mounted transversely of the optical path in the projector. The aperture is defiend in the central portion of the support plate. The shutter mechanism comprises a pair of elongated, horizontally-oriented, thin sheet metal blades having identical shapes. The blades are pivoted in symmetrical fashion about points on opposite sides of the aperture and open outwardly from the center so that a generally horizontal opening is defined soon after the blades begin to move apart. According to one feature of the invention, the opposed edges of the blades are angled so that the opening initially formed is generally in the form of a rectangular slit, defined by the blade edges and aperture sides, making immediately visible a line of text, for example, along its entire length.

The blades are rotated between the open and closed positions by a single, horizontally-oriented, lightweight sheet metal link pivotally coupled to the blades. The link is actuated to the open position by an electromagnet and returned to the closed position by a fast, spring action. Suitable stop means are provided on the support plate for cooperation with the link to limit the travel of the arm in both directions. In the closed position of the shutter, sufficient overlap of the blades is provided to preclude secondary flashes resulting from rebound of the link from the stop means. To avoid the necessity of close tolerance manufacture, and thereby reduce costs, the link may be fabricated with a U-shaped bend along a portion of its length to permit final adjustment of its overall length after assembly of the mechanisms.

Another aspect of the invention comprises the electrical system connected to energize the electromagnet which controls the motion of the link. Basically, the electrical system includes a timing circuit comprising a passive network having an RC time constant which may be adjusted to obtain the desired flash duration. More specifically, in the flash mode of operation, the RC circuit is quickly charged from the line supply through a switch means. The RC circuit is then connected to discharge through a circuit which energizes a relay switch for the appropriate duration. In its energized state, the relay switch connects the electromagnet with the line supply. A separate switch is provided to connect the electromagnet directly to the supply for locking the shutter in the open position for continuous viewing.

The shutter mechanism and control circuit of the invention may also be installed in individual viewer apparatus.

BRIEF DESCRIPTION OF THE FIGURES

A better understanding of the invention may be had by reference to the detailed description below, taken in conjunction with the accompanying drawings, in which:

FIG. 1 is a perspective, exploded view of a tachistoscopic projector in accordance with one example of the present invention;

FIG. 2 is a simplified perspective, block and schematic representation of the salient components of the tachistoscopic projector of FIG. 1 including the shutter mechanism and shutter mechanism control circuit;

FIG. 3 is a top view of the shutter mechanism shown in FIG. 2;

FIG. 4 is a rear, elevation view in section, of the shutter mechanism shown in FIG. 3 taken along the plane 4—4;

FIG. 5 is a rear, sectional, elevation view of the shutter mechanism of FIG. 2 shown in the partially open position;

FIG. 6 is a rear, sectional, elevation view of the shutter mechanism of FIG. 2 shown in the fully open position;

FIG. 9 is a perspective, block and schematic representation of a shutter mechanism and energizing circuit in accordance with another example of the present invention;

FIG. 10 is a top view of a portion of the shutter mechanism shown in FIG. 9;

FIG. 11 is a rear, sectional, elevation view of the shutter mechanism of FIGS. 9 and 10 as seen along the plane 11—11 in FIG. 10;

FIG. 12 is an elevation view, in section, of a mode selector lever assembly taken along the plane 12—12 in FIG. 11;

FIGS. 13A, 13B and 13C are elevation views, in section, of the various positions of the mode selector lever of FIG. 10 taken along plane 13—13 in FIG. 10;

DETAILED DESCRIPTION OF THE DRAWINGS

Figure 14:
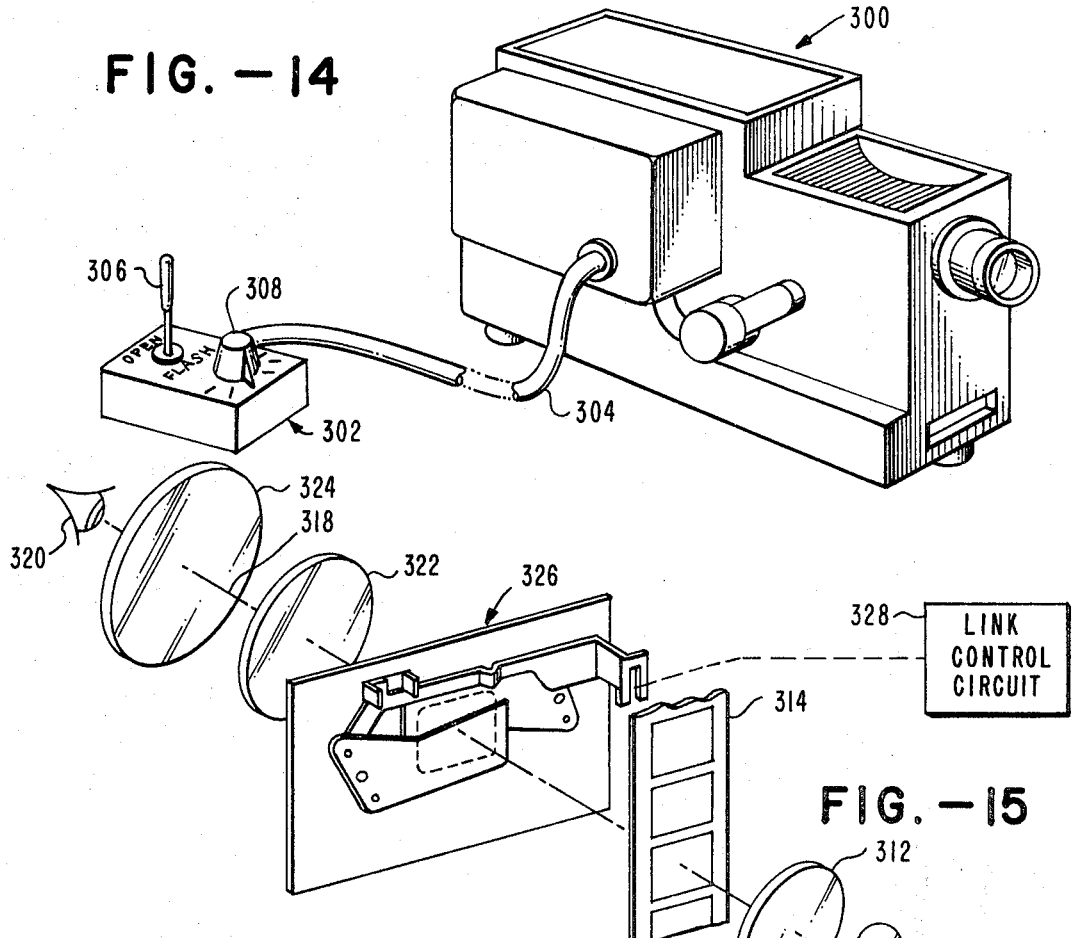
FIG. 14 is a perspective view of a tachistoscopic projection system employing a remote control unit in accordance with another aspect of the present invention.

The principal components of an apparatus constructed in accordance with the invention are shown in perspective in FIGS. 1 and 2. FIG. 1 shows a conventional film strip and slide projector 10 which includes a slide mechanism slot 12, normally utilized for receiving a slide mechanism (not shown) to permit viewing individual slides. The projector 10 also has provision for receiving a film strip 14, which is threaded through the projector, and which may be intermittently advanced by means of a manual frame advance knob 16, to show successive frames. A frame adjustment control 18 is also provided for vertically centering or framing the successive images or presentations on the viewing element.

The projector briefly described above may be easily converted to a tachistoscope by the addition of a shutter system 20, insertable in the slide mechanism slot 12. The shutter system 20 includes a shutter mechanism 21 and a control circuit assembly 22 conveniently mounted on a circuitboard 23. The circuitboard 23, attached by suitable fastening means to one edge of the shutter mechanism 21, is disposed closely adjacent to the outer side wall of the projector 10 when the shutter system 20 is in place. The shutter system 20 is held in place by means of a screw 24 passing through a mounting tab 25 depending from the shutter mechanism 21 and received in a threaded hole 26 provided in the side wall of the projector 10. Projecting from the front face of the shutter apparatus 20 is a flash duration selector knob 28 and a mode selector switch lever 30. When in place, the external portions of the apparatus 20 may be covered by a housing 32 which attaches to the projector wall by means of quick-disconnect fasteners (not shown). The housing 32 is provided with two holes 34 and 36 through which the shafts supporting the flash duration selector knob 28 and switch lever 30, respectively, project. A time duration scale 38 on the front face of the housing 32 cooperates with the knob 28 to indicate the selected flash duration. In the example to be discussed, flash durations ranging from $\frac{1}{40}$ of a second to one second are provided in six steps, the intermediate steps including $\frac{1}{20}$, $\frac{1}{10}$, $\frac{1}{5}$ and $\frac{1}{2}$ second.

Turning to FIG. 2, the essential components of the viewing system arranged for tachistoscopic displays will now be described. The conventional projector components include a high wattage rating light source 40 which permits daylight viewing, a lamp power supply 41, a condensing lens means including a plano-convex lens 42 and a double convex lens 44, and a front focusing or projection lens 46. These components form an optical path 48 shown extended to a viewing element 50 which typically takes the form of a screen. The film strip 14 is fed through conventional guides past a film framing aperture (not shown) by a toothed cylindrical driving member 52 connected to the manual frame advance knob 16 and frame adjustment control 18 which in FIG. 2 are represented by a block 53. Many aspects of the film feed and guide system have been omitted from the drawing inasmuch as these elements are not pertinent to the present invention.

With the mechanism described thus far an image 59 is projected on the viewing element 50; this image will remain on the viewing element so long as a particular frame on the film strip 14 remains in the optical path 48.

To aid in understanding the description of the shutter apparatus, reference should now also be made to FIGS. 3–6. The shutter mechanism 21 includes a support plate 56, generally rectangular in shape and provided in its central portion with a rectangular aperture 58. The support plate further includes an internal flange 60, formed along the edge opposite the mounting tab 25 already described, and a projecting portion 62. The shutter mechanism 21 also includes a pair of elongated, horizontally disposed blades 64 and 66 pivotally mounted about pins 68 and 70, respectively, anchored in the support plate 56 on the opposite sides of the aperture 58. The upper edge 72 of the lower blade 66 and the lower edge 74 of the upper blade 64 are angled with respect to a horizontal center line, as best shown in FIG. 4, with the blades in the closed position. There is also a substantial amount of overlap between the blades in the closed position as best shown in FIGS. 2 and 4. The blades 64 and 66 are made symmetrical and thus only one stamping die is necessary.

The blades 64 and 66 are rotated between their closed and open positions by a link 76. The link 76 includes a horizontal segment 78, a slanting arm 80 depending from the horizontal segment 78 at one end thereof, and a bent end 82, provided with a slot 83, formed at the other end of the horizontal segment 78. The horizontal segment 78 of the link 76 is pivotally pinned to the blade 64 at the point 84 and the slanting arm 80 is pivotally pinned to the blade 66 at the point 86. It will thus be seen, referring to FIGS. 4–6, that horizontal movement of the link 76 to the right causes the blades to rotate to the open position while movement of the link 76 to the left causes the blades to close. It will also be noted in FIGS. 4–6, that line 88, passing through the pivot points 84 and 68, is at an angle $\theta$ with respect to a vertical line 90 passing through the pivot 68. Similarly, a line 92 passing through the pivot points 70 and 86 defines an angle $\theta$ with a vertical line 94 passing through pivot point 70. Comparing FIGS. 4, 5 and 6, the pivot points 84 and 86 pass over center as the blades move from the closed position of FIG. 4 to the fully open position of FIG. 6. The purpose of this overcenter movement is to minimize the magnitude of the vertical component of displacement of the link 76 and thereby reduce the possibility of jamming.

Movement of the link 76 in the horizontal direction may be limited by any suitable stop means. A simple arrangement is shown in FIGS. 2–6 in which appropriate cuts are made in the support plate 56 during fabrication and the tabs 100 and 102 bent rearwardly to cooperate with an upwardly directed projection 104 on the link 76, located at the junction of the horizontal segment 78 and slant arm 80.

Figure 7:
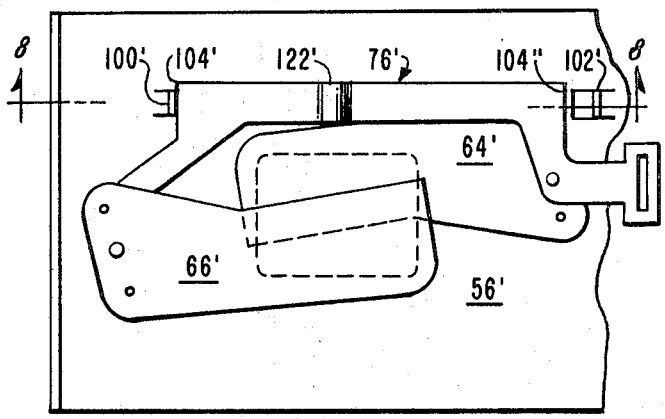
FIG. 7 shows a rear elevation view of an alternative embodiment of a stop means for use with the shutter mechanism of the invention.
Figure 8:
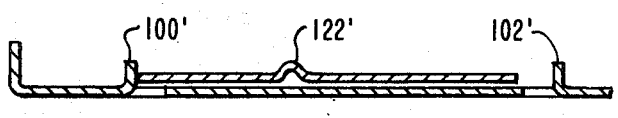
FIG. 8 is a sectional view of the apparatus of FIG. 7 taken along the plane 8—8.

An alternative stop means is shown in FIGS. 7 and 8. Blades 64' and 66', pivotally mounted on a support plate 56' in the manner already described, are actuated by a link 76'. The ends 104' and 104" of the link 76' are formed as straight, vertical abutment surfaces to come into contact with stop tabs 100' and 102', respectively, at the extremities of the horizontal travel of the link 76'.

Actuation of the link 76 is accomplished by an electromagnet 106 having a mounting plate 108 suitably affixed to the projecting portion 62 of the support plate 56. The electromagnet includes a wound coil 110 having terminals 112 and 114, a pole piece 115, and an armature 116 pivotally mounted on the plate 108 and biased away from the pole piece 115 by a flat spring 118. In the energized state of the electromagnet 106, the armature is attracted toward the coil 110 to come into contact with the pole piece 115. The free end 120 of the armature 116 engages the slot 83 of the link 76 in a relatively loose fit.

The horizontal segment 78 of the link 76 is fabricated with a U-shaped bend 122 (122' in the example of FIGS. 7 and 8) which permits fine adjustments to be made in the overall length of the link 76 after assembly of the shutter mechanism. This is accomplished by opening or closing the U-shaped bend as required. Adjustments may also be made in the angular displacements of the blades and the amount of blade overlap by both adjusting the positions of the stop tabs 100 (100') and 102 (102') and compressing or opening the U-shaped bend 122. These features reduce cost in that close tolerance manufacture is not necessary.

In the operation of the device described so far, the shutter blades 64 and 66 open when the armature 116 moves to the right, as seen in FIGS. 3–6, drawing the link 76 with it. When the blades 64 and 66 are in the partially open position as shown in FIG. 5, the angled edges 72 and 74 are parallel to one another thereby forming a narrow, rectangular opening 124. Since the shutter blades have only moved a relatively short distance to the position shown in FIG. 5, the central opening 124 becomes almost immediately visible upon energization of the electromagnet 106. Thus, a complete line of text, for example, comes almost immediately into view. All of the movable elements described so far, which include the blades 64 and 66, the link 76 and the armature 116, are all made of thin, lightweight sheet metal and may be easily fabricated and bent into the necessary shapes. The lightness of all of the movable parts maintains inertia at a minimum and the action of the shutter is extremely rapid in response to the energizing signal applied to the electromagnet 106 and the return force generated by the spring 118. Further, as best seen in FIG. 3, the sheet metal construction affords a slim structure occupying little space along the optical path introducing substantially no visual distortions of the light beam and making installation in the slide mechanism slot possible.

As already stated, when the electrical signal is removed from the electromagnet 106, the spring 118 rapidly returns the armature 116 to its initial position, thereby closing the shutters 64 and 66. Since there may be a slight amount of rebound when the projection 104 comes in contact with the tab 100, the blades may move apart slightly as a result. It is for this reason that the overlap between the blades is provided.

The shutter mechanism control circuit, for energizing the coil 110 for selectable intervals, is shown in FIG. 2. The circuit is powered by a conventional 117 volt, 60 Hz. alternating current source (not shown) connected to a pair of terminals 132 and 133. A load resistor 134, a diode 136, and a filter capacitor 138 coupled across the terminals 132 and 133, provide filtered, unidirectional voltage at the junction point 140. The coil terminals 112 and 114 are connected across the capacitor 138 by conductors 142 and 144. A single pole, normally open relay switch 146, connected in the line 144, controls the current to the coil. Basically, a timing circuit 148 controls the interval during which the switch 146 is closed and the coil 110 energized. The timing circuit 148 includes an RC circuit 149 comprising the series combination of a resistor 150 and a capacitor 152 connected between the line 142 and the common terminal 154 of a single pole double throw switch 156 operated by the lever 30. The switch 156 has a lower, stationary contact 158 connected directly to the line 144 and an upper contact point 159. The switch 156 is biased to the position shown by the solid line by a spring means 160.

A resistive network 161 comprising the parallel resistors 162, 164, 166, 168 and 170 is coupled between the line 142 and the contact 159 through a single pole, 6-position rotary stepping switch 172, operated by the knob 28, which selectively connects one of the five resistors across the RC circuit 149. The sixth position of the switch 172, indicated by the reference numeral 171, is an open connection, and does not add any shunt resistance to the circuit. This is the one second position of the switch 172. The resistors 162–170 are all differently valued and the particular resistor connected into the circuit by the rotary switch 172 determines the overall time constant of the timing circuit 148. Connected in parallel with the RC circuit 149 and the resistive network 161 is the relay coil 174 which operates the switch 146 as indicated by the broken line. A shunt resistor 175, across the coil, may be added to compensate for circuit inaccuracies to enable precise adjustment of exposure times. This makes it possible to use a low cost, wide tolerance capacitor 152.

In the operation of the circuit described up to this point, tachistoscopic projections are made by first selecting, by means of the flash duration selector knob 28, the desired time duration of image viewing. The switch lever 30 is then pushed downwardly to the "Flash" position thereby completing the connection between terminals 154 and 158 and opening the connection between terminals 154 and 159 in the switch 156. The RC circuit 149 is thereby coupled across the power supply and the capacitor 152 charges very quickly through the resistor 150. The RC circuit values may be chosen so that the charge time is no more than several thousandths of a second. Releasing the switch lever 30 permits the switch 156 to snap back to its original position thereby connecting the RC circuit 149 across the selected resistor 162, 164, 166, 168 or 170, and the relay coil 174. Discharge of the capacitor now takes place for a period determined by the time constant of the passive network including the selected resistor 162, 164, 166, 168 or 170, and the relay coil 174, the coil 174 being energized for that period to hold the switch 146 closed. When the capacitor 152 has discharged to a level below the threshold of the relay coil 174, the switch 146 opens and the shutter quickly snaps back to its closed position as a result of the action of the flat spring 118.

Coupled between the line 142 and the line 144, on the power supply side of switch 146, is the series combination of a resistor 176 and a capacitor 178. This network functions to absorb inductive kickback of the electromagnet coil 110 and reduces arcing across the points of switch 146.

The inclusion of a switch 180 between the junction of capacitor 178 and the resistor 176 and the terminal 114 of the coil 110 permits the coil 110 to be energized for any desired length of time, thereby locking the shutter in the "Open" position, because this switch bypasses the relay switch 146. The switch 180 can be a separate unit or can be combined with the switch 156 to be operated by the single switch lever 30. This switch, which may be a Switchcraft No. 29306T, a commercially available device, will then have a "Neutral" position, a "Flash" position, and an "Open" position. In the "Neutral" position of the switch, the positions of the switches 156 and 180 are that shown by the solid lines in the circuit diagram of FIG. 2. In the "Flash" mode of operation, the lever 30 is moved down to make contact with the point 158, as indicated by the broken lines, the switch 180 remaining open. In the "Open" position, the switch 156 is in the position shown by the solid line and the switch 180 is closed, as shown by the broken line.

The advantage of the foregoing circuit is that the flash duration time is in no way dependent upon any manual manipulations. The length of time that the switch 156 is held in the flash position is immaterial because the RC circuit 149 charges very quickly. When the lever 30 is released to return to its neutral position, in which the RC circuit 149 discharges through the selected resistor of the resistive network 161 and the coil 174, the discharge time is only dependent upon circuit values and in no way affected by the operator. Thus, a high degree of repeatability is made possible.

Suitable values of circuit elements are as follows:

Resistor 134—33 ohms, ½ w., 10%
Resistor 150—100 ohms, ½ w., 10%
Resistor 162—10000 ohms, ½ w., 10%
Resistor 164—2700 ohms, ½ w., 10%
Resistor 166—1000 ohms, 1 w., 10%
Resistor 168—560 ohms, 1 w., 10%
Resistor 170—470 ohms, 1 w., 10%
Resistor 175—27000–68000 ohms, ½ w., 10%
Resistor 176—1500 ohms, 3 w., (wirewound)
Capacitor 138—20 mfd., 150 v., electrolytic
Capacitor 152—40 mfd., 150 v., electrolytic
Capacitor 178—20 mfd., 150 v., electrolytic Turning now to FIGS. 9–13 of the drawings, an alternative example of a shutter system in accordance with the invention is shown which is similar in many respects to the embodiment discussed in connection with FIGS 1–8. The main distinctions which characterize the alternative example are the provision of a mechanical locking arrangement to hold the shutter in the open position without energization of the electromagnet, reversal of the operation of the mode selector switch, and provision of an alternative shutter blade geometry. Other more minor differences will be pointed out and discussed as the description proceeds.

In FIG. 9, it will be seen that the overall shutter system 200 includes principally a shutter mechanism 202 and a circuitboard 204 suitably attached to shutter mechanism 202 and extending at right angles thereto. For simplicity, the control circuit components are shown in the form of a schematic diagram; the various electrical components in the practical embodiment are, of course, appropriately arranged and interconnected on the circuitboard 204.

The shutter mechanism 202 includes a support plate 206 having an aperture 208, generally rectangular in shape, formed therein and disposed in the optical path 210 which also intercepts a movable record member such as a film strip 212 and a projection lens 214 which forms the front part of the projection system as already discussed and serves to focus the image on a viewing element 215. Pivotally mounted on the support plate 206 by spaced anchor pins 216 and 218 are generally rectangular, elongated shutter blades 220 and 222. The blades 220 and 222 may be provided with the same geometrical shape as discussed in connection with the first example of the invention. The blades 220 and 222 illustrate an alternative form with straight inner edges, useful in limited applications where it is of less importance to have a central, horizontal slit portion of the image first come into view. The blades are actuated in a manner already described by means of an elongated link 224 pinned to the blades 220 and 222 at points 226 and 228, respectively. One end of the link 224 is bent rearwardly to form a tab 230.

Mounted on the circuitboard 204 is an electromagnet 232 having a coil 234 and axially disposed pole piece 236. The electromagnet 232 further includes an armature 238 pivotally mounted at 240 on the electromagnet mount 233 and biased away from the pole piece 236 by a flat spring 242. The forward end of the armature 238 is bent so as to be disposed generally parallel to the support plate 206 and provided with a slot 244 for receiving the tab 230.

It will be seen that when the armature moves toward the pole piece 236, the link 224 is moved to the left which rotates the blades 220 and 222 about their respective pivot points to the "Open" position. The flat spring 242 provides a fast return for the armature 238 so that the shutters quickly close when the electromagnet 232 is de-energized.

Also mounted on the circuitboard 204 are a mode selector lever 250 and a single pole double throw switch 252. The switch 252 includes three spring contacts 254, 256 and 258, the spring contact 256 having a forwardly extending portion 256a. The mode selector lever 250 is pivoted about a point 260 and includes a depending arm 262 and a trapezoidally shaped cam surface 264 extending from the lever 250 generally normal to the circuitboard 204.

The spring contact 256 is normally biased into engagement with the spring contact 254 and out of engagement with the spring contact 258, as best shown in FIG. 12 and schematically in the circuit diagram of FIG. 9. Referring to FIG. 12, it will be seen that the mode selector lever 250 has three positions—an upper "Lock" position, a center "Neutral" position and a lower "Flash" position. The lever 250 and the switch 252 are positioned relative to one another so that when the lever 250 moves from the "Neutral" to the "Flash" position, the depending arm 262 engaging the extention 256a and presses the spring contact 256 downwardly into contact with the lower spring contact element 258.

The control circuit for energizing the electromagnet 232 for the required time durations is essentially the same as that discussed in connection with FIG. 2, thus including a source of filtered unidirectional voltage 270 connected to a timing circuit 272 and to the electromagnet 232 via a switching means 274. The timing circuit 272 includes an RC circuit 276, a resistor network 278 and a relay coil 280 adapted to be connected in parallel with each other through the switch 252.

Referring to FIGS. 9, 12 and 13A–13C, the operation of the alternative example under discussion will now be described. With the mode selector switch 250 in the neutral position, contacts 254 and 256 are closed, thereby causing the capacitor of the RC network 276 to charge from the supply 270. Tachistoscopic operation is accomplished by pressing the lever 250 downwardly, thereby making contacts 256 and 258 and breaking contacts 254 and 256. This connection is shown by the broken line in the schematic of FIG. 9 and in this position of the lever 250, the capacitor discharges through the timing circuit 272 at a rate determined by the overall time constant of the timing circuit, which, in turn, is a function of the particular resistor of the resistance network 278 selected by the rotary switch 277. Discharge of the capacitor energizes the relay coil 280 which closes the switch 274 for the predetermined duration.

In the lock position of the lever 250, as best illustrated in FIG. 12A, the cam member 264 engages the armature 238 and urges the armature toward the pole piece and into contact therewith. This action opens the shutter blades 220 and 222 for as long a period as desired.

A stop means, for limiting the travel of the shutters 220 and 222, includes a cylindrical member 290 secured to the support plate 206 in the inclosed space defined by the blades 220 and 222 and the link 224. As shown in FIG. 11, in the fully open position of the blades, the link 224 engages the cylindrical member 290 while in the closed position of the shutter, the upper edge of the blade 222 engages the element 290.

FIG. 14 shows an alternative embodiment of the invention in which a tachistoscopic projector 300 is controlled by a remote unit 302 connected to the projector by multiconductor cable 304. The remote unit 302 contains a mode selector switch 306, of the type already described and a flash duration rotary switch 308, also described earlier. The remote unit 302 may contain (referring to FIG. 2) all circuit components with the exception of the power supply section (which includes load resistor 134, diode 136 and capacitor 138) and, of course, the electromagnet 106 which actuates the shutter. It will be seen therefore that a three wire cable can be used to interconnect the unit 302 with the projector 300.

Figure 15:
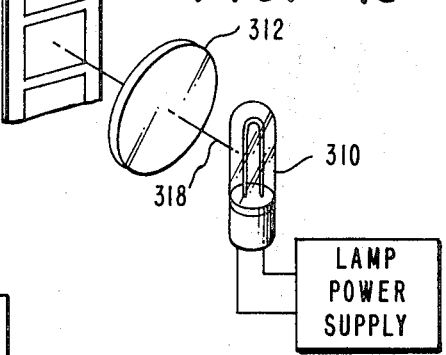
FIG. 15 is a simplified perspective and block representation of an individual viewing system utilizing a shutter mechanism in accordance with the present invention.

In FIG. 15, a film strip viewer for individual use is shown in which a lamp 310, a diffusing screen 312, a film strip 314 and magnifying lens system 316 are arranged along an optical path 318 along which the observer's eyes 320 sight. The diffusing screen 312 may simply be a piece of frosted glass. The magnifying lens system, which may be considered as the viewing element, includes a first plano-convex lens 322 and a second, larger plano-convex lens 324. A shutter mechanism 326, formed in accordance with the invention, is installed between the first magnifying lens 322 and the film strip 314. The shutter mechanism is controlled by the apparatus and circuitry, indicated by block 328, of the present invention.

There have been described and illustrated various forms of shutter apparatus and related control systems for tachistoscopic devices. It will be appreciated that the invention is not limited thereto, but includes all forms and modifications falling within the scope of the appended claims.

What is claimed is:

1. A tachistoscopic display system for providing an image on a viewing element for a determinable, variably selective duration including an optical path defined by a light source, lens means, and the viewing element, said system further including:
   shutter means in the optical path, responsive to a control signal to open for said duration and permit viewing of said image, the shutter means comprising:
      means defining a generally rectangular aperture in the optical path;
      an elongated, generally horizontally-oriented blade pivoted about a point on each side of the aperture, each blade in the closed position, covering a portion of the aperture and in partial overlapping relation with the other blade; and
      actuating means connected to pivot the blades in scissors action about the pivot points in response to the control signal to uncover the aperture, the blades receding from one another upon actuation whereby the central portion of the aperture is opened during initial movement of the blades to define, in conjunction with said aperture, during movement of said blades, a rectangular, horizontal slit to rapidly make visible in its entirety on said viewing element, a central, rectangular portion of said image.

2. A system as defined in claim 1, in which the blades have inner, opposed edges angled to define with the sides of the aperture said rectangular, horizontal slit during the initial movement of the blades.

3. A shutter mechanism for insertion in the light beam of a tachistoscopic display apparatus, the shutter mechanism comprising:
   support means having a generally rectangular aperture;
   a pair of substantially planar blades carried by said support means, said blades being substantially parallel to one another, each blade having an inner portion and an outer portion and mounted for rotation on the support means between opened and closed positions, the inner portions of the blades covering the aperture in the closed position;
   means connected to the blades for rotating the blades in contrarotating relation whereby the blades are movable apart to the opened position to uncover the aperture and movable together to the closed position to cover the aperture, said blades being shaped to define with said aperture during the movement of said blades toward the opened position, a horizontally oriented, rectangular slit.

4. A shutter mechanism, as defined in claim 3, in which the means for rotating the blades includes:
   an elongated link connected at points along its length to said blades, the link being mounted for substantially linear motion along its length to rotate the blades in unison.

5. A shutter mechanism, as defined in claim 4, in which:
   a portion of the length of the link is U-shaped to permit adjustment of the overall length of the link subsequent to assembly of the shutter mechanism.

6. A shutter mechanism, as defined in claim 3, in which the support means includes:
   stop means cooperating with the link to limit the travel of the link in both directions.

7. A shutter mechanism, as defined in claim 3, in which:
   one of the blades is adapted to cover substantially the upper half of the aperture and the other blade is adapted to cover the remainder of the aperture, the blades having opposed, inner edges angularly oriented with respect to the horizontal in the closed position of said blades, said blades being symmetrically movable to define said slit during at least a part of the travel of the blades.

8. A tachistoscopic display system for providing illumination of a viewing element for a predeterminable, variably selective duration, comprising:
a source of light disposed along an optical path to the viewing element;
means in the optical path providing a record member to be displayed;
shutter means disposed in the optical path and including a pair of pivotally mounted blades coupled to, and controlled by, an electromagnet, which, when energized, rotates the blades about their pivot points to an open position, the shutter means having a fast return action when the electromagnet is de-energized, said blades shaped to define, during their movement toward the open position, a horizontal, parallel sided slit; and
circuit means, connected to energize the electromagnet and including a network having a selectively variable time constant, for controlling the duration of energization of the electromagnet.

9. A shutter mechanism for use in the optical path of a tachistoscopic display system, said mechanism including:
a support plate defining a substantially rectangular aperture;
a first shutter blade formed of thin sheet metal and mounted on the support plate to pivot about a first axis substantially normal to the blade and support plate, said first axis passing through the blade near one end thereof and through the support plate at a point adjacent a first side of the aperture;
a second shutter blade having the same size and shape as the first blade and formed of thin sheet metal, said second blade being mounted on the support plate, in symmetric opposition to the first blade, to pivot about a second axis substantially normal to the second blade and support plate, said second axis passing through the second blade near one end thereof and through the support plate at a point adjacent a second side of the aperture opposite the first side;
an elongated, horizontally oriented, reciprocably movable, thin sheet metal link pivotally connected to the blades at spaced points along the link to rotate the blades in counter-rotating, symmetric, scissors action about said axes between open and closed positions, the blades overlapping and occluding the aperture in the closed position and uncovering the aperture in the open position, the link further including a U-shaped bend along its length for post-assembly length adjustment and a forked end;
stop tabs formed in the support plate and positioned to be engaged by portions of the link to limit the reciprocal movement of the link in both directions;
an electromagnet having a pole piece and a movable armature, the armature being formed to engage the forked end of the link to displace the link to open the shutter blades upon energization of the electromagnet; and
spring bias means connected to the electromagnet armature to quickly move the link to close the shutter blades upon de-energization of the electromagnet.

10. A mechanism, as defined in claim 9, in which:
the inner, opposed edges of the blades are angled to form a narrow, horizontal, and substantially rectangular opening when the blades initially open.

11. A shutter mechanism for insertion in the light beam of a tachistoscopic display apparatus, the shutter mechanism comprising:
support means having a generally rectangular aperture;
a pair of substantially planar blades carried by said support means, said blades being substantially parallel to one another, each blade having an inner portion and an outer portion and mounted for rotation on the support means between open and closed positions, the inner portions of the blades covering the aperture in the closed position;
means connected to the blades for rotating the blades in contrarotating relation whereby the blades are movable apart to the open position to uncover the aperture and movable together to the closed position to cover the aperture, said blades being shaped to define with said aperture during the movement of said blades toward the open position, a horizontally-oriented, rectangular slit; and
means operatively associated with the blades for locking the blades in the open position.

12. A shutter mechanism for insertion in the light beam of a tachistoscopic display apparatus, the shutter mechanism comprising:
support means defining an aperture;
a pair of blades pivotally carried by said support means, said blades being mounted on the support means for rotation about axes between an open position and a closed position, each blade having an inner portion covering a portion of the aperture in said closed position, one of said blades covering substantially the upper half of the aperture and the other blade covering the remainder of said aperture in said closed position, said blades having opposed inner edges oriented, when the blades are in the closed position, at equal angles with respect to the horizontal, rotation of said blades toward the open position rapidly defining, in conjunction with said aperture, a central, rectangular, horizontally-oriented slit; and
a link pivotally connected to said blades for actuating said blades symmetrically and in unison between said open and closed positions, the pivot connection points of said link and said blades in said closed position being on the same side of vertical lines extending through said blade axes, said pivot connection points traveling overcenter to the other side of said vertical lines during movement of said blades, whereby the vertical displacement of said link during actuation of said blades is minimized.

References Cited

UNITED STATES PATENTS

| 418,318 | 12/1889 | Hegg | 95—62 |
| 2,986,968 | 6/1961 | Kropp et al. | 35—35.2 XR |
| 3,018,686 | 1/1962 | Kurz | 35—35.2 XR |
| 3,021,751 | 2/1962 | Barnette | 353—91 XR |
| 3,179,004 | 4/1965 | Stoyanoff et al. | 35—35.2 XR |
| 3,341,951 | 9/1967 | Barnette | 35—35.2 |
| 3,308,718 | 3/1967 | Antos | 353—89 |
| 3,400,473 | 9/1968 | Nunn | 35—35.2 |

NORTON ANSHER, Primary Examiner

R. P. GREINER, Assistant Examiner

U.S. Cl. X.R.

35—35; 95—53, 56, 62